US009436530B2

(12) United States Patent
Fukuda et al.

(10) Patent No.: US 9,436,530 B2
(45) Date of Patent: Sep. 6, 2016

(54) PROVIDING INPUT FROM INPUT DEVICE TO CORRESPONDING APPLICATION PROGRAM

(71) Applicant: International Business Machines Corporation, Armonk, NY (US)

(72) Inventors: Susumu Fukuda, Tokyo (JP); Yoshio Horiuchi, Tokyo (JP); Satoko Kinoshita, Tokyo (JP); Kinichi Mitsui, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/107,060

(22) Filed: Dec. 16, 2013

(65) Prior Publication Data

US 2014/0181841 A1 Jun. 26, 2014

(30) Foreign Application Priority Data

Dec. 21, 2012 (JP) .................................. 2012-279964

(51) Int. Cl.
*G06F 9/54* (2006.01)
*G06F 3/023* (2006.01)
*G06F 3/038* (2013.01)

(52) U.S. Cl.
CPC ............... *G06F 9/542* (2013.01); *G06F 3/023* (2013.01); *G06F 3/038* (2013.01); *G06F 2203/0382* (2013.01); *G06F 2209/545* (2013.01)

(58) Field of Classification Search
None
See application file for complete search history.

(56) References Cited

U.S. PATENT DOCUMENTS

| 2006/0253831 | A1* | 11/2006 | Harper et al. ................. 717/106 |
| 2008/0320219 | A1* | 12/2008 | Okada et al. ................. 711/114 |
| 2011/0248959 | A1* | 10/2011 | Diehl ............................. 345/175 |
| 2012/0136917 | A1* | 5/2012 | Abramson et al. ........... 709/203 |
| 2012/0262379 | A1* | 10/2012 | King ............................. 345/173 |
| 2012/0284702 | A1* | 11/2012 | Ganapathy et al. .......... 717/174 |
| 2013/0279877 | A1* | 10/2013 | Boak ............................. 386/231 |

FOREIGN PATENT DOCUMENTS

WO 2005114452 A2 12/2005

\* cited by examiner

*Primary Examiner* — Umut Onat
(74) *Attorney, Agent, or Firm* — Cantor Colburn LLP; Maeve Carpenter

(57) ABSTRACT

Embodiments include providing input from each of a plurality of input devices to one of a plurality of application programs. Aspects include receiving an input from one of the plurality of input devices, determining if the input from the one of the plurality of input devices has a corresponding application program selected from the one of a plurality of application programs. Based on determining that the input from the one of the plurality of input devices corresponds with the corresponding application program, aspects include forwarding the input to the corresponding application program. Aspects also include determining if the input corresponds to a second application programs from the plurality of application programs that is in a state of waiting for input to one application program has been entered from one input device and responsively establishing a correspondence between the second application program and the one of the plurality of input devices.

9 Claims, 5 Drawing Sheets

| DISPLAY UNIT 112 | | |
|---|---|---|
| APPLICATION PROGRAM | INPUT DEVICE | FOCUS |
| APP a | FIRST | |
| APP b | FIRST | |

FIG. 4

| DISPLAY UNIT 122 | | |
|---|---|---|
| APPLICATION PROGRAM | INPUT DEVICE | FOCUS |
| APP A | SECOND | O |
| APP C | SECOND | |
| APP B | FIRST | |

FIG. 5

PROVIDING INPUT FROM INPUT DEVICE TO CORRESPONDING APPLICATION PROGRAM

CROSS REFERENCE TO RELATED APPLICATION

This application claims priority to JP Application No. 2012-279964, filed Dec. 21, 2012, and all the benefits accruing therefrom under 35 U.S.C. §119, the contents of which in its entirety are herein incorporated by reference.

BACKGROUND

Embodiments of the invention relate generally to providing an input from an input device to a corresponding application program.

Conventionally, when two display devices are connected to one computer system to display operation screens of multiple software applications on the respective display devices, a technique has been known which notifies a user of a switched state at the stage of switching between the operation screens to prevent an erroneous operation.

BRIEF SUMMARY

Embodiments include a method, system, and computer program product for providing input from each of a plurality of input devices to one of a plurality of application programs. Aspects include receiving an input from one of the plurality of input devices, determining if the input from the one of the plurality of input devices has a corresponding application program selected from the one of a plurality of application programs. Based on determining that the input from the one of the plurality of input devices corresponds with the corresponding application program, aspects include forwarding the input to the corresponding application program. Aspects also include determining if the input corresponds to a second application programs from the plurality of application programs that is in a state of waiting for input to one application program has been entered from one input device and responsively establishing a correspondence between the second application program and the one of the plurality of input devices.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings.

FIG. 4 shows an example in which a storage section according to the embodiment lists correspondences of application programs displayed on a display unit.

FIG. 5 shows an example in which the storage section according to an exemplary embodiment lists correspondences of application programs displayed on a display unit.

DETAILED DESCRIPTION

While the present invention will be described below in connection with an embodiment, it is to be understood that the embodiment to be described below is not intended to limit the inventions according to the appended claims, and not all the combinations of the features described in the embodiment are necessarily essential to the means for solving the problems.

Figure 1:
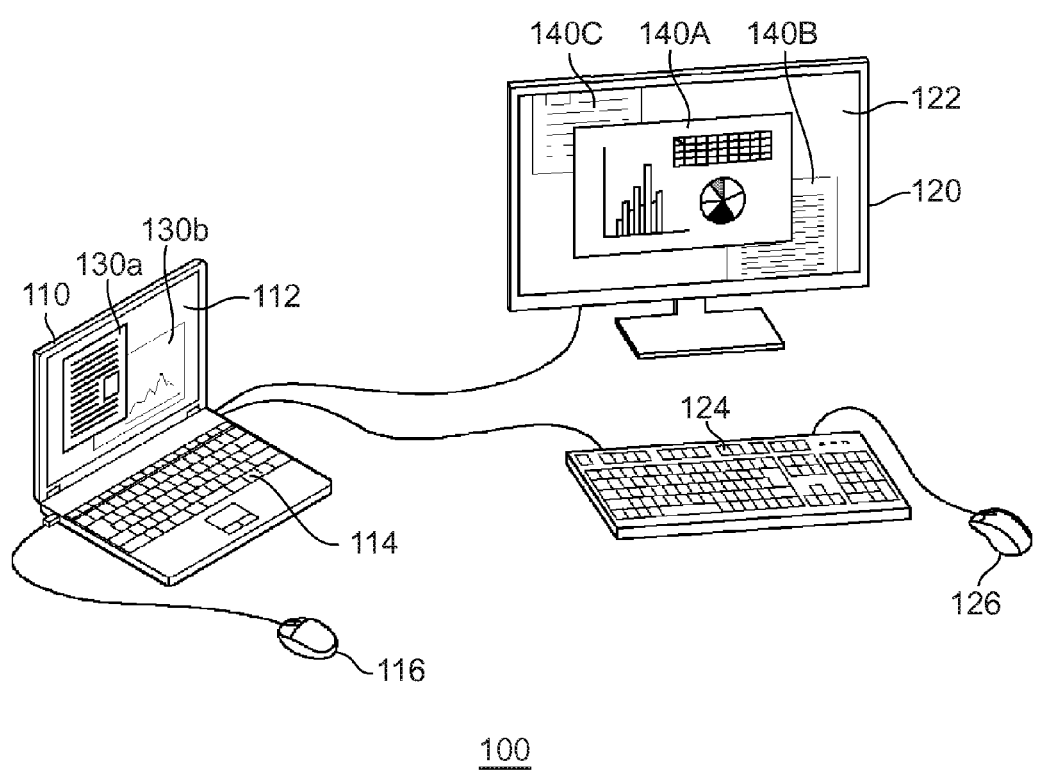
FIG. 1 shows a configuration example of a system for providing an input from an input device to a corresponding application program according to an exemplary embodiment.

FIG. 1 shows a system 100 for providing an input from an input device to a corresponding application program according to the embodiment. The system 100 checks on an input having a possibility of being a user's input error as to whether the input is to be provided or not in order to prevent an operation unintended by the user from being performed. The system 100 includes a computer main body 110 and a display device 120.

An operating system (OS) is installed on the computer main body 110, and multiple application programs run on the OS. The computer main body 110 is, for example, a personal computer such as a desktop type, a notebook type, or a tablet type. In the embodiment, description will be made of a case where the computer main body 110 is a notebook personal computer. The computer main body 110 has a display unit 112, a keyboard 114, and a mouse 116.

The display unit 112 shows screens on which the OS and application programs to run on the computer main body 110 are executed. The display unit 112 shows screens according to an execution instruction from the user to the computer main body 110, such as sending and receiving mails, web browsing, participating in a social networking service, image or video browsing, document editing, and game playing. The display unit 112 is, for example, a display device such as a liquid crystal display, a plasma display, or an organic electroluminescence display.

In FIG. 1, the display unit 112 shows an example of displaying execution screens 130a and 130b as display screens of application programs, respectively. Here, as an example, the execution screens 130a and 130b are windows displayed according to the application programs running on the OS. The application programs may be executed on a window-by-window basis.

The keyboard 114 and the mouse 116 are used to input operation instructions from the user to the OS and the application programs. For example, the keyboard 114 and the mouse 116 are used to input instructions such as to execute an application program, move an execution screen 130, perform a focus (active) operation for enabling an input on the execution screen 130, perform a minimization operation to make the execution screen 130 disappear from the display unit 112, perform an operation for restoring the minimized execution screen 130, and perform an operation for character input and editing within the execution screen 130.

The keyboard 114 and the mouse 116 are also used to input operation instructions to the OS and the application programs displayed on the display device 120 in addition to the OS and the application programs displayed on the display unit 112. In other words, the keyboard 114 and the mouse 116 are used to input operation instructions to two or more display devices.

In the embodiment, the keyboard 114 and the mouse 116 are assumed as a first input device. Here, the first input device is provided in the computer main body 110 or connected to the computer main body 110 to input operation instructions to the computer main body 110. The first input device may also include pointing devices, such as a track ball, a pointing stick, a touch pad, a tablet, and/or a joystick.

A keyboard 124 and a mouse 126 are also connected to the computer main body 110. Like the keyboard 114 and the mouse 116, the keyboard 124 and the mouse 126 are used to input operation instructions to the two or more display devices. In the embodiment, the keyboard 124 and the mouse 126 are assumed as a second input device. Here, the second input device is connected to the computer main body 110 and used to input operation instructions to the computer main body 110.

The display device 120 is connected to the computer main body 110 to display screens for executing the OS and application programs that run on the computer main body 110. The display device 120 may display screens different from the screens displayed on the display unit 112 of the computer main body 110, or screens almost identical to the screens displayed on the display unit 112 instead.

For example, the display device 120 has a display unit 122 to display execution screens of the OS and application programs on the display unit 122. Alternatively, the display device 120 may be a projector for projecting images. FIG. 1 shows an example in which the display unit 122 displays execution screens 140A, 140B, and 140C of application programs, respectively.

Using the above system 100, the user executes multiple application programs. As an example, the user enters an operation instruction to an execution screen 130 displayed on the display unit 112 mainly using the first input device, and enters an operation instruction to an execution screen 140 displayed on the display unit 122 mainly using the second input device. Thus, the user can enter operation instructions to the multiple display devices using the input devices located near the respective display devices.

Here, for example, description will be made of a case where the user moves an execution screen to the display unit 122 using the first input device after executing an application program using the first input device and displaying the execution screen on the display unit 112. If the screen moved by the user to the display unit 122 is the execution screen 140A, the execution screen 140A will remain focused immediately after being moved.

Here, the user may pay attention to, for example, the execution screen 130a displayed on the display unit 112, such as to display a mail reception screen, newly arriving news, update of weather forecasting information, or an application program that has been executed. Then, for example, the user may want to start an operation to the execution screen 130a, such as to check mails, display the details of news, display the details of weather forecast, or execute the application program.

In this case, since the previous operation input is from the first input device near the display unit 112, the user may have an illusion that the user is in the process of entering input to the display unit 112. As a result, the user starts input to the execution screen 130a before focusing the execution screen 130a, and this causes an input error to the focused execution screen 140A.

Therefore, the system 100 establishes a correspondence between an input device and an application program, and detects a possibility of being a user's input error when an operation instruction has been entered from an input device that is not brought into correspondence with the application program. When detecting the possibility of a user's input error, the system 100 confirms with the user whether the input is to be provided in order to prevent an operation unintended by the user from being performed. The operation of the system 100 will be described below.

Figure 2:
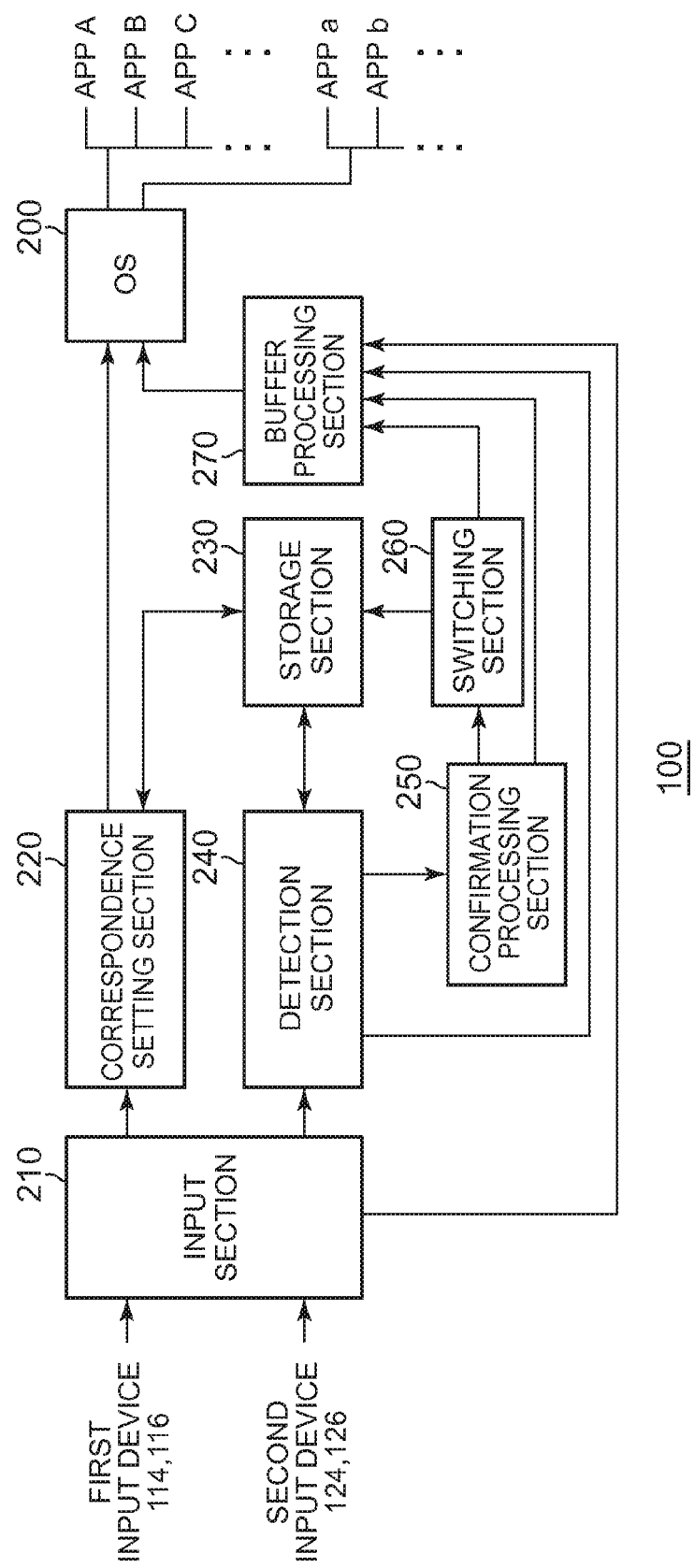
FIG. 2 shows an example of a functional configuration for describing the operation of the system according to an exemplary embodiment.

FIG. 2 shows an example of a functional configuration for describing the operation of the system 100 according to the embodiment. Here, the OS 200 may be any OS that runs on the computer main body 110, such as Windows (registered trademark) series, Mac OS series, AIX (registered trademark), Linux (registered trademark), or ANDROID (registered trademark).

Apps A, B, C, and apps a, b as application programs are executed on the OS 200. FIG. 2 shows an example in which apps A, B, and C correspond to the execution screens 140A, 140B, and 140C displayed on the display device 120, respectively, and apps a and b correspond to the execution screens 130a and 130b displayed on the display unit 112, respectively.

As an example, FIG. 2 shows a configuration that functions when a program is executed on the computer main body 110. The system 100 has an input section 210, a correspondence setting section 220, a storage section 230, a detection section 240, a confirmation processing section 250, a switching section 260, and a buffer processing section 270.

Operation instructions are input to the input section 210 from multiple input devices (first and second input devices in FIG. 2). As an example, the operation instructions are input to the input section 210 through the OS 200. Further, as an example, the input section 210 receives, from the OS 200, information on application programs displayed on the display units 112 and 122, and information on currently-focused application programs.

The correspondence setting section 220 is connected to the input section 210, and in response to receiving an input from any one of the multiple input devices to an application program, establishes a correspondence between the application program and the input device. The correspondence setting section 220 establishes a correspondence between a specific application program and an input device from which the user has entered an operation instruction when the correspondence setting section 220 can determine that the input of the operation instruction entered by the user is the input to the specific application program.

Further, the correspondence setting section 220 provides the operation instruction to the OS 200 so that the input operation instruction will be executed. In this case, the correspondence setting section 220 may provide the operation instruction directly to the OS 200 or through the buffer processing section 270 instead.

For example, the correspondence setting section 220 brings each of apps A, B, C and app a, b as application programs into correspondence with either of the first input device and second input device, respectively. The correspondence setting section 220 transfers, to the storage section 230, information on the correspondences between the application programs and the input devices.

The storage section 230 is connected to the correspondence setting section 220 to store the correspondence information received from the correspondence setting section 220. For example, the storage section 230 stores correspondence information for each display unit. The storage section 230 may store the correspondence information for each input device, or may store the correspondence information for each application program instead.

The detection section 240 detects whether an input accepted from the user in a state of waiting for input to one application program has been entered from one input device brought into correspondence with the one application program. The detection section 240 is connected to the input section 210 to detect, for example, whether an operation instruction received from the user through the input section 210 when the execution screen of the application program is being focused has been entered from the input device brought into correspondence with the focused one application program.

When detecting that the operation instruction from the user has been entered from the input device brought into correspondence with the focused one application program, the detection section 240 provides the operation instruction to the OS 200. In this case, the detection section 240 may provide the operation instruction to the OS 200 through the buffer processing section 270. On the other hand, when detecting that the operation instruction from the user has been entered from another input device that is not brought into correspondence with the one application program, the detection section 240 transfers the detection result to the confirmation processing section 250.

When the input from the other input device is accepted in the state of waiting for input to the one application program, the confirmation processing section 250 confirms with the user whether the input is to be entered to the one application program. Here, for example, the confirmation processing section 250 is connected to the detection section 240 to receive, from the detection section 240, information on the input from the other input device accepted in the state of waiting for input to the one application program.

When the input from the other input device is accepted in the state of waiting for input to the one application program, the confirmation processing section 250 may confirm with the user whether the input is to be entered to either the one application program or another application program brought into correspondence with the other input device by the correspondence setting section 220. The confirmation processing section 250 transfers, to the switching section 260, information on the user's input result as a response to the inquiry.

The switching section 260 provides the input from the other input device in the state of waiting for input to the one application program to another application program brought into correspondence with the other input device the last time. In other words, the switching section 260 is connected to the confirmation processing section 250 to provide the input operation instruction to the other application program when the user selects input to the other application program brought into correspondence with the other input device in response to the inquiry from the confirmation processing section 250.

On the other hand, when the user selects input to one application program that is not brought into correspondence with the other input device in response to the inquiry from the confirmation processing section 250, the switching section 260 provides the input operation instruction to the one application program. In this case, the switching section 260 is connected to the storage section 230 to bring the other input device into correspondence with the one application program, and transfer the correspondence to the storage section 230. Further, the switching section 260 provides the operation instruction from the user to the OS 200 through the buffer processing section 270 together with information on the selected application program.

The buffer processing section 270 is connected to the input section 210 to buffer an input from an input device accepted in the state of waiting for input to one application program and provide the buffered input to an application program as an input target after user confirmation. When an operation instruction from the user is provided to the application program, the buffer processing section 270 provides the input buffered by the input section 210 to the application program as the destination together with the operation instruction from the user.

In other words, the buffer processing section 270 is connected to the switching section 260 to provide, to the OS 200, the input from the other input device and buffered by the input section 210 in addition to the operation instruction received from the user through the switching section 260 and information on the application program. The buffer processing section 270 is also connected to the confirmation processing section 250 to provide, to the OS 200, an input from one input device and buffered by the input section 210 in addition to the operation instruction received from the user through the confirmation processing section 250.

Further, when the buffer processing section 270 is connected to the detection section 240, the buffer processing section 270 provides, to the OS 200, the input buffered by the input section 210 in addition to the operation instruction received from the user through the detection section 240 and information on the application program.

Figure 3:
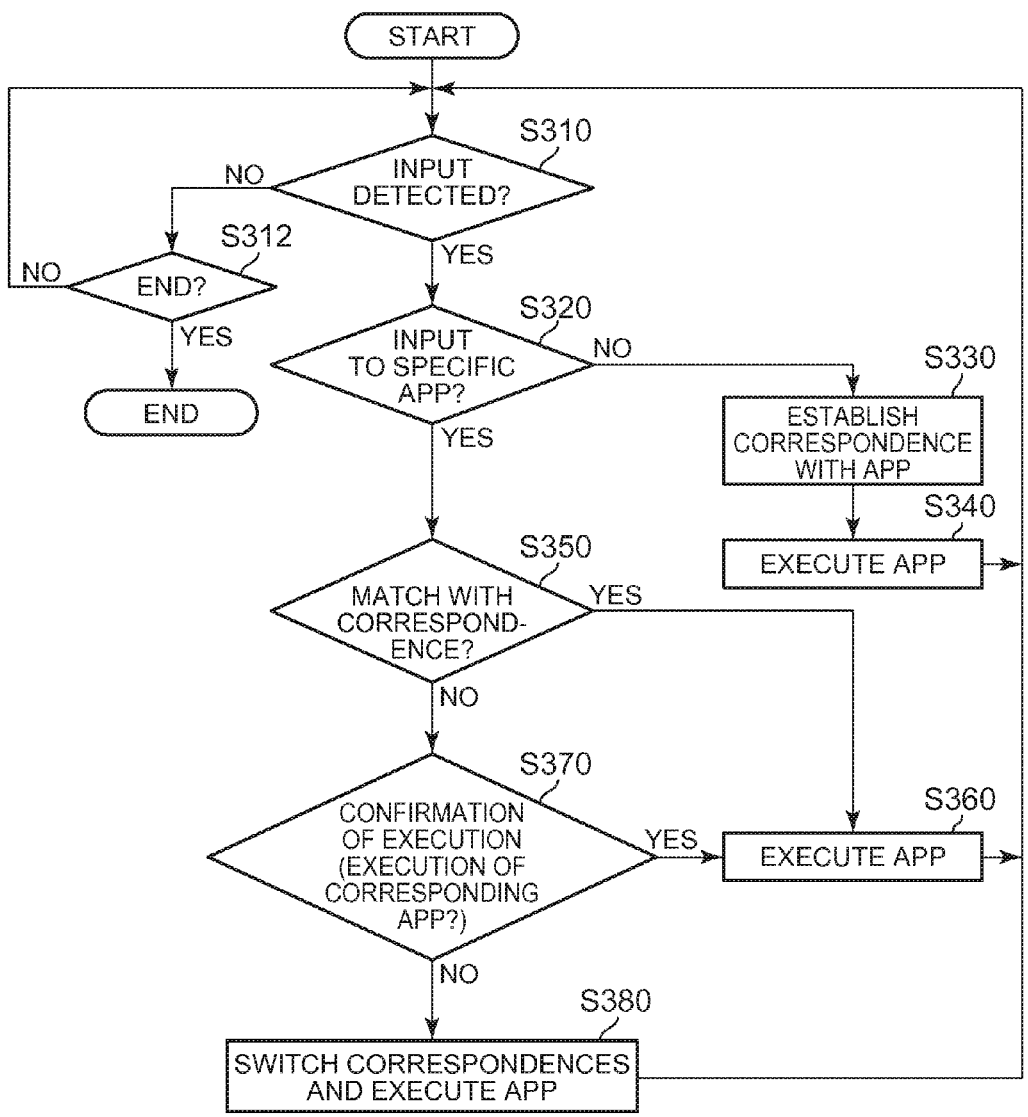
FIG. 3 shows an operation flow of the system according to an exemplary embodiment.

FIG. 3 shows an operation flow of the system 100 according to the embodiment. The system 100 executes operation blocks S310 to S380 to prevent an operation unexpected by the user from being performed even when an input error occurs due to a user's illusion or the like.

First, the input section 210 detects an input from an input device (S310). When there is no input from any input device (S310: No) and there is no input to end the operation of the system 100, the input section 210 repeats the operation for detecting an input from an input device (S312: No).

Further, the system 100 ends the operation of the system 100 in response to an instruction to end the operation being given by exiting the program or the power-off of the computer main body 110 (S312: Yes). Note that the input to end the operation from the user may be made effective in blocks other than block S312. In this case, the system 100 ends the operation of the system 100 in response to a termination instruction from the user.

When the input section 210 detects an input from an input device (S310: Yes) and the input of an operation instruction from the user can be determined to be an input to a specific application program (S320: Yes), the correspondence setting section 220 establishes a correspondence between the application program and an input device from which the user has entered the operation instruction (S330).

For example, when an operation instruction for executing app a and displaying the execution screen 130a is input from the first input device, the correspondence setting section 220 establishes a correspondence between the app a and the first input device. Further, in response to inputting an operation instruction for focusing an execution screen of an application program, an operation instruction for moving the execution screen, or an operation instruction to a GUI component, such as a button, a slider, a list box, or a toolbar displayed on the execution screen, the correspondence setting section 220 establishes a correspondence between the application program and an input device from which the user has entered the operation instruction.

For example, when an operation instruction for focusing the execution screen 130b of app b has been entered from the second input device, the correspondence setting section 220 establishes a correspondence between the app b and the second input device. Further, in response to inputting an operation instruction for restoring or maximizing a minimized execution screen of an application program, the correspondence setting section 220 may establish a correspondence between the application program and an input device from which the user has entered the operation instruction. The correspondence setting section 220 transfers correspondence information to the storage section 230 to store the information therein.

Here, when a correspondence with the application program is already stored in the storage section 230, the correspondence is updated. Further, as an example, the storage section 230 stores the correspondence information in a list format. In this case, up-to-date information is stored at the top of the list.

FIG. 4 and FIG. 5 show examples of lists of correspondence information stored by the storage section 230. Here, FIG. 4 shows an example in which the storage section 230 lists correspondences of application programs displayed on the display unit 112, and FIG. 5 shows an example in which correspondences of application programs displayed on the display unit 122 are listed.

FIG. 4 shows an example of a list created when app a is executed and the execution screen 130a is displayed on the display unit 112 after the user uses the first input device to execute app b and display the execution screen 130b on the display unit 112. FIG. 5 shows an example of a list created when the user moves the execution screen 140B to the display unit 122 after the user uses the first input device to execute app B and display the execution screen 140B on the display unit 112, then uses the second input device to execute app C and move the execution screen 140C to the display unit 122, and then uses the second input device to execute app A and move the execution screen 140A to the display unit 122.

FIG. 4 and FIG. 5 also show an example in which the execution screen 140A of app A is focused. Here, as an example, the storage section 230 updates the list by erasing information on app b in the second line of the list in FIG. 4 and adding information on app b to the first line when the user uses the first input device to focus the execution screen 130b. In this case, the storage section 230 may erase focus information in the first line of FIG. 5 and add a focus mark to information in the first line of FIG. 4. Thus, the storage section 230 updates correspondence information between application programs and input devices.

Next, the correspondence setting section 220 provides, to the OS 200, an operation instruction from the user and information on the application program as the destination to which the operation instruction is to be provided. This enables the OS 200 to provide the operation instruction from the user to the application program and execute the application program according to the operation instruction (S340). After execution of the application program, the procedure returns to block 310 in which the input section 210 detects an input from an input device.

When the input of an operation instruction from the user cannot be determined to be an input to a specific application program (S320: No), the detection section 240 detects whether the operation instruction received from the user through the input section 210 has been entered from an input device brought into correspondence with the focused application program (S350). For example, when the user starts entering characters using the first input device or the second input device, it cannot be determined whether the character entry is an input to the focused application program or an input error to another application program due to an illusion or the like.

For example, when the execution screen 140A is focused, the OS 200 assumes that the character entry is an input to app A, but if the character entry is actually an input to app a due to a user's illusion or the like, the character entry to app A will result in an input error. Therefore, based on the correspondence information stored in the storage section 230, the detection section 240 detects whether there is a possibility that the operation instruction from the user is an input error.

When the input device from which the operation instruction from the user has been entered and the focused application program match with the correspondence stored (S350: Yes), the detection section 240 provides the operation instruction from the user and information on the application program to the OS 200 to execute the application program according to the operation instruction (S360).

The following will describe a state in which the execution screen 140A of app A brought into correspondence with the second input device is focused on the display unit 122 and the app A waits for input. In this case, the detection section 240 detects whether the operation instruction from the user has been entered from the second input device. In other words, the detection section 240 reads correspondence information stored in the storage section 230 to compare the input device, which is brought into correspondence with the focused application program, with the input device used by the user.

When detecting that the operation instruction from the user has been entered from the corresponding second input device, the detection section 240 provides the operation instruction to the OS 200. In other words, when the execution screen 140A of the display unit 122 is focused and the user starts entering characters using the second input device from which the operation instruction for the focus has been entered, the detection section 240 determines that the possibility of a user's input error is low.

The detection section 240 may also determine that the possibility of a user's input error is low when the execution screen 140A of the display unit 122 is focused and the user starts entering characters using the second input device located near the display unit 122. After the OS 200 executes the application program, the procedure moves to block 310 in which the input section 210 returns to the state of waiting for input.

When the correspondence between the input device from which the user has entered the operation instruction and the focused application program does not match with the correspondence stored (S350: No), the detection section 240 transfers information input to the input section 210 and the correspondence information to the confirmation processing section 250. The confirmation processing section 250 makes an inquiry to the user about whether the operation instruction from the user is an input to the focused application program (S370).

For example, when the user starts entering characters onto the execution screen 140A focused on the display unit 122 by using the first input device that does not correspond to the execution screen 140A, the detection section 240 determines that the possibility of a user's input error is high. In other words, since the user does not use the second input device from which the operation instruction for the focus has been entered regardless of the fact that the execution screen 140A is focused on the display unit 122, the detection section 240 determines that there is a possibility of being a user's input error. The detection section 240 may also determine that there is a possibility of being a user's input error when the user starts entering characters using the first input device located away from the display unit 122 regardless of the fact that the execution screen 140A is focused on the display unit 122.

The confirmation processing section 250 confirms with the user whether it is an input error or not. In this case, as an example, the confirmation processing section 250 makes an inquiry to the user about "is it an input to app A?" and displays a dialog asking the user to select "Yes" or "No". The confirmation processing section 250 may display the dialog on both the display unit 112 and the display unit 122, or the dialog may be displayed on a display unit located near the input device used by the user to enter input instead. The confirmation processing section 250 may generate a warning sound to notify the user of the possibility of an input error or that an application program as the input destination is not determined.

Further, the confirmation processing section 250 may make an inquiry to the user about whether the operation instruction from the user is an input to the focused application program or an input to an application program brought into correspondence with the input device from which the operation instruction has been entered. In this case, for example, the confirmation processing section 250 makes an inquiry about "is it an input to app A or app a?" and displays a dialog asking the user to select either of "app A" and "app a."

When multiple execution screens of multiple application programs brought into correspondence with the first input device (e.g., the execution screens 130a and 130b) are displayed, for example, on the display unit 112, the confirmation processing section 250 adopts, as an option, an application program brought into correspondence by the correspondence setting section 220 the last time. Further, the confirmation processing section 250 may adopt, as an option, an application program brought into correspondence with the first input device the last time among application programs whose execution screens are at least partially displayed on the display unit 112 from the multiple application programs.

Alternatively, when multiple execution screens of multiple application programs brought into correspondence with the first input device are displayed on the display unit 112, the confirmation processing section 250 may adopt, as options, a predetermined number of application programs among the multiple application programs. In this case, the confirmation processing section 250 adopts, as options, the predetermined number of application programs in order from the first line of the correspondence list created by the storage section 230.

The confirmation processing section 250 may also add, to the dialog, an input cancel item as an option. When the user selects the cancel item, the procedure moves to block 310 through block S360, in which an application program is executed, to return the input section 210 to the state of waiting for input.

Further, as an example, after a predetermined period of time has elapsed since a confirmation screen to the user such as the dialog was displayed, the confirmation processing section 250 accepts the confirmation by the user. This can prevent the confirmation processing section 250 from determining a user's input to an application program to be the confirmation input by mistake.

When it is obtained as user's response that the operation instruction is the input to an application program brought into correspondence with the input device concerned (S370: Yes), the confirmation processing section 250 provides, to the OS 200, the operation instruction and information on the corresponding application program to execute the corresponding application program according to the operation instruction (S360).

Further, when it is obtained as user's response that the operation instruction is the input to the focused application program (S370: No), the confirmation processing section 250 provides, to the OS 200, the operation instruction and information on the focused application program to execute the focused application program according to the operation instruction (S380). In this case, the confirmation processing section 250 transfers the operation instruction and the information on the focused application program to the switching section 260, and the switching section 260 switches the correspondence of the focused application program to the input device from which the operation instruction has been entered.

Here, there is a case where the confirmation processing section 250 can obtain as user's response only the fact that the operation instruction is not the input to any application program brought into correspondence with the input device concerned (S370: No). For example, this is a case when the user selects "No" after the confirmation processing section 250 makes an inquiry about "is it an input to app A?" In this case, the confirmation processing section 250 provides the operation instruction to an application program brought into correspondence with the input device the last time.

Further, for example, there is a case where multiple execution screens of application programs corresponding to the input device concerned are displayed on a display unit. In this case, the confirmation processing section 250 provides an operation instruction to an application program brought into correspondence with the input device the last time among application programs whose execution screens are at least partially displayed on the display unit of the display device from the multiple application programs.

The switching section 260 brings the operation instruction into correspondence with the application program received, and stores the correspondence in the storage section 230. The switching section 260 further provides the operation instruction and information on the application program, which are received from the confirmation processing section 250, to the OS 200 through the buffer processing section 270.

The buffer processing section 270 provides the received operation instruction and information on the application program to the OS 200 together with buffered input information from the user. Here, the buffer processing section 270 may display buffered operation instruction on a display unit. The buffer processing section 270 may display the operation instruction on both the display unit 112 and the display unit 122, or display the operation instruction on a display unit located near the input device used by the user to enter input instead.

Here, when the confirmation processing section 250 displays a dialog, the buffer processing section 270 may display the operation instruction in a manner to be superimposed on the dialog or near the dialog. Thus, for example, when the user has entered characters as the operation instruction, since the input character string is displayed together with the confirmation dialog, it can be made easier to properly determine to which application program the input is even if the user is under an illusion. After the OS 200 executes the application program according to information received from the buffer processing section 270, the procedure moves to block 310 to return the input section 210 to the state of waiting for input.

According to the system 100 of the aforementioned embodiment, the possibility of a user's input error can be determined based on the input device from which the user has entered the input in the state of waiting for input to one application program to make an inquiry to the user about whether the input is correct or not. This can prevent an operation unintended by the user from being performed even if the user has entered the input incorrectly, enabling an input from an input device to be provided to a corresponding application program.

Further, when it is determined that the possibility of a user's input error is low, the system 100 provides an input from an input device to a corresponding application program immediately without making any inquiry to the user. Thus, the system 100 can prevent an operation unintended by the user from being performed without adding any redundant operation to the user.

According to the system 100 of the aforementioned embodiment, the possibility of a user's input error is determined based on the input device from which the user has entered the input in the state of waiting for input to one application program. Alternatively, the system 100 may further include a camera for imaging the user's face to detect the direction of the user's face at the time of input by using the camera and specify to which of the display units of the display devices the user tries to enter input in order to determine the possibility of an input error.

In this case, the confirmation processing section 250 may confirm whether the input is to an application program that was the last to be brought into correspondence with an input device located near the display unit toward which the user's face is turned. Thus, if the user presses an OK button, the possibility of selecting an application program to which the user wants to enter input can be increased and hence operationality can be improved.

In the system 100 according to the aforementioned embodiment, the user manipulates multiple application programs using two input devices and two corresponding display units. Alternatively, the system 100 may include two or more input devices and two or more corresponding display units. In this case, the multiple input devices and the multiple display devices are connected to the computer main body 110, respectively.

Here, each of the multiple input devices may have a light including a light-emitting device such as an LED. Among the multiple input devices, one input device brought into correspondence with one application program may put the light on in the state of waiting for input to the one application program. This enables the multiple input devices to clearly indicate, to the user, which input device corresponds to a focused application program.

Alternatively, or in addition, each of multiple windows as execution screens of the multiple application programs may show an icon or the like used to specify a corresponding input device. This enables the system 100 to visualize a correspondence between the focused application program and the input device.

The correspondence setting section 220 according to the aforementioned embodiment establishes correspondences between multiple input devices and the multiple application programs, respectively. In addition, the correspondence setting section 220 may establish a correspondence between each of the multiple input devices and each display unit of the multiple display devices, respectively.

In this case, as an example, the correspondence setting section 220 establishes a correspondence between an application program and an input device brought into correspondence with a display unit as a display destination of the execution screen of the application program on condition that the display destination of the execution screen of the application program is moved to any one of the multiple display units. Thus, when the user moves the execution screen of an application program displayed on the display unit of one display device to the display unit of another display device, the correspondence of the application program can be updated.

Further, the correspondence setting section 220 may establish a correspondence between the execution screen of an application program and an input device brought into correspondence with a display unit as a display destination of the application program on condition that the display destination of the execution screen of the application program is moved to any one of the display units of the multiple display devices and that the system gets into a state of waiting for input to any application program other than the application program concerned.

As an example, the following will describe a case where the execution screen of one application program displayed on one display unit brought into correspondence with one input device is moved using the one input device to another display unit brought into correspondence with another input device. In this case, the correspondence of the one application program can be so updated that the one application program will be brought into correspondence with the other display unit as a destination and the other input device when the user selects and focuses another application displayed on the one display unit after moving the one application program.

Further, the correspondence setting section 220 may establish a correspondence between an application program and an input device brought into correspondence with a display unit as a display destination of the execution screen on condition that the display destination of the execution screen of the application program is moved to any one of the display units of the multiple display devices and that a pointer to be displayed on the display unit is moved to a display unit different from the display unit as the destination.

As an example, the following will describe a case where a mouse as one input device is used to move the execution screen of one application program, displayed on one display unit brought into correspondence with the one input device, to another display unit brought into correspondence with another input device. In this case, the correspondence of one application program whose execution screen is moved can be so updated that the one application program will be brought into correspondence with the other display unit as the destination and the other input device when the user returns the mouse pointer of the mouse to the display unit brought into correspondence with the one input device after moving the one application program.

Further, the correspondence setting section 220 may establish a correspondence between an application program and an input device brought into correspondence with a display unit as a display destination of the execution screen on condition that the display destination of the execution screen of the application program is moved to any one of the display units of the multiple display devices and that a pointer to be displayed on the display unit is moved to the outside of the execution screen of the application program.

According to the system 100 of the aforementioned embodiment, a confirmation with the user is made when the possibility of a user's input error to one application program is determined in the state of waiting for input to the one application program. Alternatively, the system 100 may ignore the possibility of a user's input error to the one application program.

In this case, the system 100 transfers the input to another application program brought into correspondence with another input device without user confirmation when there is an input from the other input device in the state of waiting for input to the one application program. Thus, the display is provided on a display unit different from the display unit on which the focused application program is displayed so that the user can start entering an operation instruction to an application program brought into correspondence with the input device the last time among unfocused application programs without performing the focusing operation.

Figure 6:
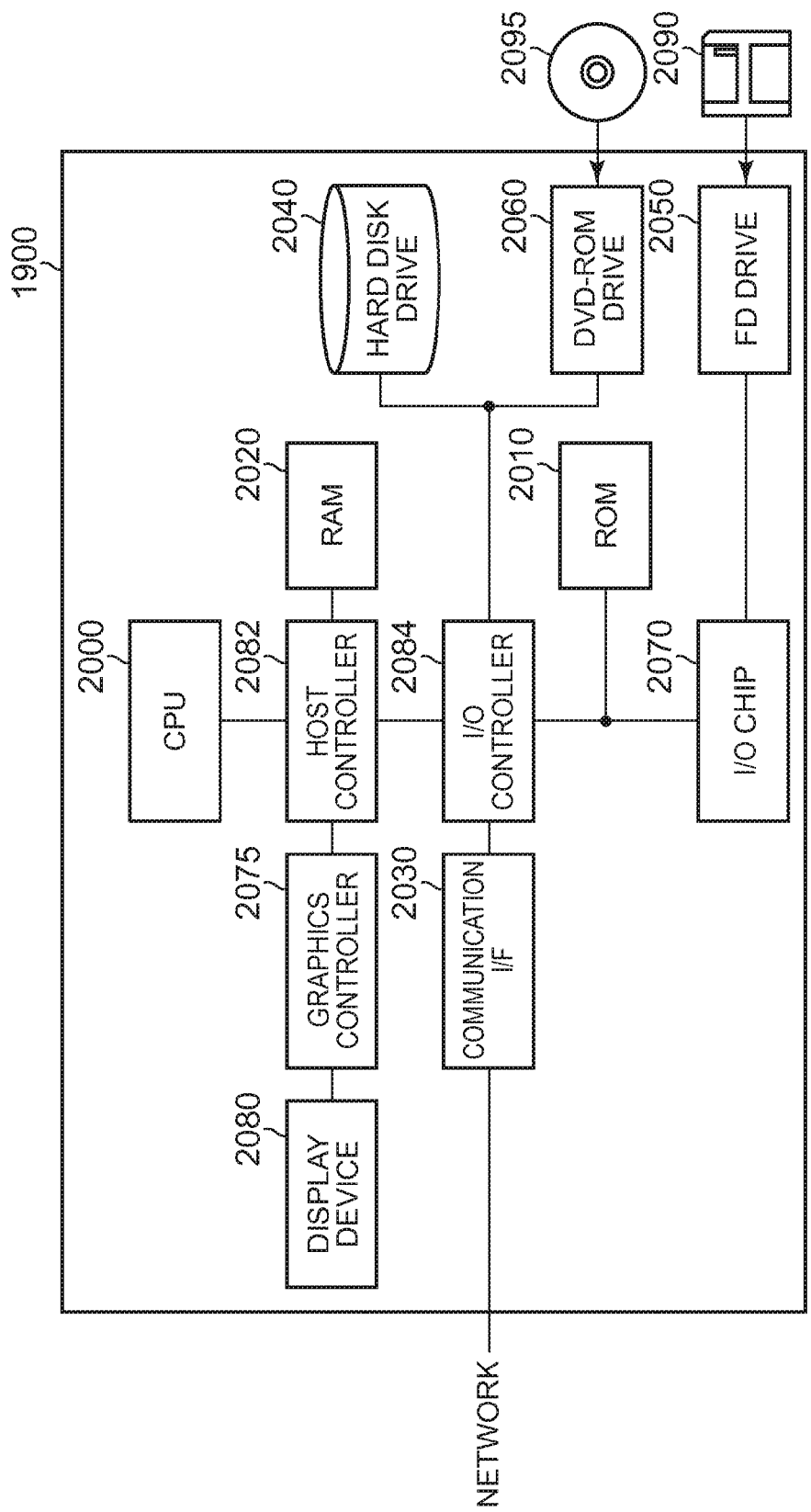
FIG. 6 shows an example of the hardware configuration of a computer functioning as the system according to an exemplary embodiment.

FIG. 6 shows an example of the hardware configuration of a computer 1900 according to the embodiment. The computer 1900 may be almost identical to the computer main body 110 described with reference to FIG. 1. The computer 1900 according to the embodiment includes: a CPU peripheral section having a CPU 2000, a RAM 2020, and a graphics controller 2075, which are interconnected by a host controller 2082, and a display device 2080; an I/O section having a communication interface 2030, a hard disk drive 2040, and a DVD drive 2060, which are connected to the host controller 2082 through an I/O controller 2084; and a legacy I/O section having a ROM 2010, a flexible disk drive 2050, and an I/O chip 2070 connected to the I/O controller 2084.

The host controller 2082 connects the RAM 2020 with the CPU 2000 and the graphics controller 2075, which access the RAM 2020 at a high transfer rate. The CPU 2000 operates based on programs stored in the ROM 2010 and the RAM 2020 to control each section. The graphics controller 2075 acquires image data generated on a frame buffer provided in the RAM 2020 by the CPU 2000 or the like, and displays the image on the display device 2080. Alternatively, the graphics controller 2075 may include therein a frame buffer for storing image data generated by the CPU 2000 or the like.

The I/O controller 2084 connects the host controller 2082 with the communication interface 2030, the hard disk drive 2040, and the DVD drive 2060 as relatively high-speed I/O units. The communication interface 2030 communicates with other apparatuses through a network. The hard disk drive 2040 stores programs and data used by the CPU 2000 in the computer 1900. The DVD drive 2060 reads a program or data from a DVD-ROM 2095 and provides the read program or data to the hard disk drive 2040 through the RAM 2020.

Also connected to the I/O controller 2084 are relatively low-speed I/O units, i.e. the ROM 2010, the flexible disk drive 2050, and the I/O chip 2070. The ROM 2010 stores a boot program executed when the computer 1900 starts, and/or programs depending on the hardware of the computer 1900. The flexible disk drive 2050 reads a program or data from the flexible disk 2090, and provides the program or data to the hard disk drive 2040 through the RAM 2020. The I/O chip 2070 connects not only the flexible disk drive 2050 to the I/O controller 2084, but also various I/O devices to the I/O controller 2084 through a parallel port, a serial port, a keyboard port, and a mouse port, for example.

The program provided to the hard disk drive 2040 through the RAM 2020 is provided by the user in a form of being stored on a recording medium, such as a flexible disk 2090, a DVD-ROM 2095, or an IC card. The program is read from the recording medium, installed on the hard disk drive 2040 within the computer 1900 through the RAM 2020, and executed by the CPU 2000.

Programs are installed on the computer 1900 to cause the computer 1900 to function as the input section 210, the correspondence setting section 220, the storage section 230, the detection section 240, the confirmation processing section 250, the switching section 260, and the buffer processing section 270.

Information processing described in the programs is read into the computer 1900 to function as specific means implemented by software in cooperation with the above-mentioned various hardware resources, i.e., as the input section 210, the correspondence setting section 220, the storage section 230, the detection section 240, the confirmation processing section 250, the switching section 260, and the buffer processing section 270. Then, information is computed or processed by the specific means depending on the intended use of the computer 1900 in the embodiment, thus building the input section 210, the correspondence setting section 220, the storage section 230, the detection section 240, the confirmation processing section 250, the switching section 260, and the buffer processing section 270 according to the intended use.

As an example, when the computer 1900 communicates with an external device, the CPU 2000 executes a communication program loaded on the RAM 2020 to instruct the communication interface 2030 to perform communication processing based on the processing content described in the communication program. Under the control of the CPU 2000, the communication interface 2030 reads send data stored in a send buffer area or the like provided in a storage device, such as the RAM 2020, the hard disk drive 2040, the flexible disk 2090, or the DVD-ROM 2095, to send the data to a network, or writes receive data received from the network into a receive buffer space provided in the storage device. Thus, the communication interface 2030 may transfer data exchanged with the storage device by the DMA (Direct Memory Access) method. Alternatively, the CPU 2000 may read data from the storage device or the communication interface 2030 as a source, and write the data to the communication interface 2030 or the storage device as a destination to transfer the send/receive data.

Further, the CPU 2000 reads, into the RAM 2020, all or necessary part of files or databases stored in an external storage device, such as the hard disk drive 2040, the DVD drive 2060 (DVD-ROM 2095), or the flexible disk drive 2050 (flexible disk 2090) by means of DMA transfer or the like to perform various processing on the data stored in the RAM 2020. Then, the CPU 2000 saves the processed data back to the external storage device by means of DMA transfer or the like. In such processing, the RAM 2020 can be considered to be a temporary storage of the content of the external storage device. Therefore, in the embodiment, the RAM 2020, the external storage device, and the like are collectively referred to as the memory, the storage unit, the storage device, or the like. Various programs in the embodiment and various kinds of information such as data, tables, and databases are stored in such a storage device as targets of information processing. Note that the CPU 2000 can also hold part of the content of the RAM 2020 in a cache memory to perform reading and writing on the cache memory. Even in such a form, since the cache memory serves as part of the function of the RAM 2020, the cache memory shall be included in the RAM 2020, the memory, and/or the storage device in the embodiment unless otherwise denoted distinctively.

Further, the CPU 2000 performs various processing on the data read from the RAM 2020 as specified in a sequence of instructions of a program including various arithmetic operations information processing, conditional determinations, and processing for searching and replacing information described in the embodiment, and saves the processed data back to the RAM 2020. For example, when a conditional determination is made, the CPU 2000 compares any of various variables shown in the embodiment with any other variable or constant to determine whether it meets a condition, such as larger, smaller, not less than, not more than, or equal to, and when the condition is satisfied (or unsatisfied), the procedure branches to a different sequence of instructions or calls a subroutine.

Further, the CPU 2000 can retrieve information stored in a file or a database in the storage device. For example, when multiple entries are stored in the storage device in such a manner to associate the attribute value of a second attribute with the attribute value of a first attribute, the CPU 2000 searches the multiple entries stored in the storage device for an entry with the attribute value of the first attribute matching with a specified condition to read the attribute value of the second attribute stored in the entry so that the attribute value of the second attribute associated with the first attribute that meets a predetermined condition can be obtained.

The above-mentioned programs or modules may be stored on an external recording medium. As the recording media, an optical recording medium such as DVD or CD, a magnetooptical recording medium such as MO, a tape medium, and a semiconductor memory such as an IC card can be used in addition to the flexible disk 2090 and the DVD-ROM 2095. Further, a storage device such as a hard disk or a RAM provided in a server system connected to a private communication network or the Internet may also be used as a recording medium to provide a program to the computer 1900 through the network.

While the present invention has been described with reference to the embodiment, the technical scope of the present invention is not limited to the description of the aforementioned embodiment. It will be obvious to those skilled in the art that various changes and modifications can be added to the aforementioned embodiment. From the appended claims, it will also be obvious that forms to which such changes or modifications are added shall be included in the technical scope of the present invention.

The operations, the procedure, the steps, and the execution sequence of processes such as stages in the apparatus, system, program, and method described in the appended claims and the specification and shown in the accompanying drawings are not particularly specified as "ahead of," "prior to," or the like. It should be noted that the operations and the like can be carried out in any order unless output of the previous process is used in the subsequent process. In the appended claims, the specification, and the operation flow in the drawings, "first," "next," and the like are used for convenience sake, but it does not mean that it is imperative to carry out the operations and the like in this order.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    receiving a first input from a user from a first input device, the first input device communicatively connected to a processor, the first input from the user from the first input device being operative to select a first application such that the first application is in an active state;
    determining whether the first input device is associated in a memory with the first application responsive to receiving the first input from the user from the first input device;
    associating the first input device with the first application in the memory responsive to determining that the first input device is not associated with the first application in the memory;
    receiving a first input from the user from a second input device, the second input device communicatively connected to the processor, the first input from the user from the second input device being operative to select a second application such that the second application is in the active state;
    determining whether the second input device is associated in the memory with the second application responsive to receiving the first input from the user from the second input device; and
    associating the second input device with the second application in the memory responsive to determining that the second input device is not associated with the second application in the memory;
    receiving a second input from the user on the first input device, the second input being operative to select the second application;
    determining whether the second input is an erroneous input, wherein the determining whether the second input is an erroneous input comprises determining whether the first input device is associated in the memory with the second application; and
    outputting an error notification to the user on a display indicating that the first input device is not associated in the memory with the second application responsive to determining that the first input device is not associated in the memory with the second application.

2. The method of claim 1, wherein the error notification provides an option to the user to input a request to the processor to associate the first input device in the memory with the second application.

3. The method of claim 1, wherein the error notification provides an option to the user to input a request to the processor to associate the first input device in the memory with the second application.

4. A system comprising:
    a memory;
    a first input device;
    a second input device; and
    a processor communicatively connected to the memory, the first input device, and the second input device, the processor operative to:

receive a first input from a user from the first input device, the first input device communicatively connected to the processor, the first input from the user from the first input device being operative to select a first application such that the first application is in an active state;

determine whether the first input device is associated in the memory with the first application responsive to receiving the first input from the user from the first input device;

associate the first input device with the first application in the memory responsive to determining that the first input device is not associated with the first application in the memory;

receive a first input from the user from the second input device, the second input device communicatively connected to the processor, the first input from the user from the second input device being operative to select a second application such that the second application is in the active state;

determine whether the second input device is associated in the memory with the second application responsive to receiving the first input from the user from the second input device; and associate the second input device with the second application in the memory responsive to determining that the second input device is not associated with the second application in the memory;

receive a second input from the user on the first input device, the second input being operative to select the second application;

determine whether the second input is an erroneous input, wherein the determining whether the second input is an erroneous input comprises determining whether the first input device is associated in the memory with the second application; and output an error notification to the user on a display indicating that the first input device is not associated in the memory with the second application responsive to determining that the first input device is not associated in the memory with the second application.

5. The system of claim 4, wherein the error notification provides an option to the user to input a request to the processor to associate the first input device in the memory with the second application.

6. The system of claim 4, wherein the error notification provides an option to the user to input a request to the processor to associate the first input device in the memory with the second application.

7. A computer program product comprising a computer readable storage medium having program instructions embodied therewith, the program instructions executable by a processor to cause the processor to perform a method comprising:

receiving a first input from a user from a first input device, the first input device communicatively connected to the processor, the first input from the user from the first input device being operative to select a first application such that the first application is in an active state;

determining whether the first input device is associated in a memory with the first application responsive to receiving the first input from the user from the first input device;

associating the first input device with the first application in the memory responsive to determining that the first input device is not associated with the first application in the memory;

receiving a first input from the user from a second input device, the second input device communicatively connected to the processor, the first input from the user from the second input device being operative to select a second application such that the second application is in the active state;

determining whether the second input device is associated in the memory with the second application responsive to receiving the first input from the user from the second input device; and associating the second input device with the second application in the memory responsive to determining that the second input device is not associated with the second application in the memory;

receiving a second input from the user on the first input device, the second input being operative to select the second application;

determining whether the second input is an erroneous input, wherein the determining whether the second input is an erroneous input comprises determining whether the first input device is associated in the memory with the second application; and outputting an error notification to the user on a display indicating that the first input device is not associated in the memory with the second application responsive to determining that the first input device is not associated in the memory with the second application.

8. The computer program product of claim 7, wherein the error notification provides an option to the user to input a request to the processor to associate the first input device in the memory with the second application.

9. The computer program product of claim 7, wherein the error notification provides an option to the user to input a request to the processor to associate the first input device in the memory with the second application.

* * * * *